United States Patent [19]

Yamamoto et al.

[11] 4,027,914
[45] June 7, 1977

[54] FITTING DEVICE FOR WINDSHIELD

[75] Inventors: Takenori Yamamoto; Tsuneo Tsukisaka; Takeshi Tsukahara, all of Kawagoe, Japan

[73] Assignee: Honda Giken Kogyo Kabushiki Kaisha, Tokyo, Japan

[22] Filed: Jan. 26, 1976

[21] Appl. No.: 652,294

[30] Foreign Application Priority Data

Jan. 29, 1975 Japan .................. 50-11422

[52] U.S. Cl. .................. 296/78.1; 296/90; 296/84 K
[51] Int. Cl.² .................. B62J 17/02
[58] Field of Search .......... 296/84 K, 90, 78 R, 296/78.1, 92

[56] References Cited
UNITED STATES PATENTS

| | | | |
|---|---|---|---|
| 1,188,105 | 6/1916 | Schlegel | 296/78.1 |
| 1,387,349 | 8/1921 | Campbell | 296/78.1 |
| 2,589,993 | 3/1952 | Comiskey | 296/78.1 |
| 3,123,839 | 3/1964 | Reid | 296/90 X |
| 3,787,088 | 1/1974 | Dreyer | 296/78.1 |

*Primary Examiner*—Richard J. Johnson
*Attorney, Agent, or Firm*—Polster and Polster

[57] ABSTRACT

A fitting device for wind shield, wherein a wind shield plate is fixed directly to the body of a motor-cycle or to a fairing surrounding the motor-cycle body by means of threaded bolts and nuts which are breakable upon external shock being imparted to the wind shield plate, and the center portion of the wind shield plate is particularly held by a hinge, etc. which is swingable in the frontward direction alone so that, when excessive impact force is applied to the windshield, it falls frontward, thereby preventing the wind shield plate from flying backward to hit a motor-cycle rider or any person nearby.

8 Claims, 4 Drawing Figures

4,027,914

FITTING DEVICE FOR WINDSHIELD

BACKGROUND OF THE INVENTION

This invention relates to a wind shield for motor-operated vehicles such as motor-cycles, scooters, etc., and, more particularly, it is concerned with a fitting device for such wind shield.

As a matter of fact, it has often taken place that, at the time of collision, abrupt stoppage, and other occasions of abrupt speed reduction in the motor-cycles, etc. during running, riders of such vehicles are instantaneously brought into an accelerated speed condition by inertia, as the result of which they lean frontward to hit themselves vigorously against the wind shield by their heads, or faces.

For the safety measures against such accident, there have so far been proposed various expedients, wherein, when an excessive impact force acts on the wind shield plate, the fitting part of the vehicle body to the wind shield is broken or deformed to cause the shield plate to fall frontward to relax the impact force, thereby protecting the vehicle rider from unexpected injury.

While the above-described concept may be effective toward the traffic accidents where the vehicles encounter head-on collision, it is apprehensive of causing another unexpected trouble to take place such that, during running of the vehicle, if some other object collides against the wind shield plate from its front and an excessive impact force acts thereon, the fitting part of the shield plate is destroyed, whereby the separated wind shield plate flies backward to give unexpected injury to the vehicle rider or any third person who happens to be close to the running vehicle.

SUMMARY OF THE INVENTION

It is therefore an object of the present invention to provide a fitting device for wind shield in motorcycles, or the like, which secures perfect safety to the wind shield plate at the time of both head-on collision of the vehicle, and of any impact force acting onto the wind shield plate from its front during running.

According to the present invention, generally speaking, there is provided a fitting device for wind shield in motor-cycles, etc., which comprises in combination: a body of the motor-cycle, a wind shield plate to be fixed to the motor-cycle body, means for fixing the wind shield plate to the motor-cycle body, and which is prone to break or deform when an excessive impact force acts thereon, and means for retaining the wind shield plate in a connected state to the motor-cycle body so as to prevent the wind shield plate from flying and hitting a cycle rider, when an excessive impact force acts on the wind shield plate from the forwarding direction of the motor-cycle and the wind shield plate fixing means becomes broken or deformed.

The foregoing object and other objects as well as detailed construction and function of the fitting device according to the present invention will become more apparent from the following explanations thereof, when read in conjunction with the accompanying drawing.

DETAILED DESCRIPTION OF PREFERRED EMBODIMENT

Figure 1:
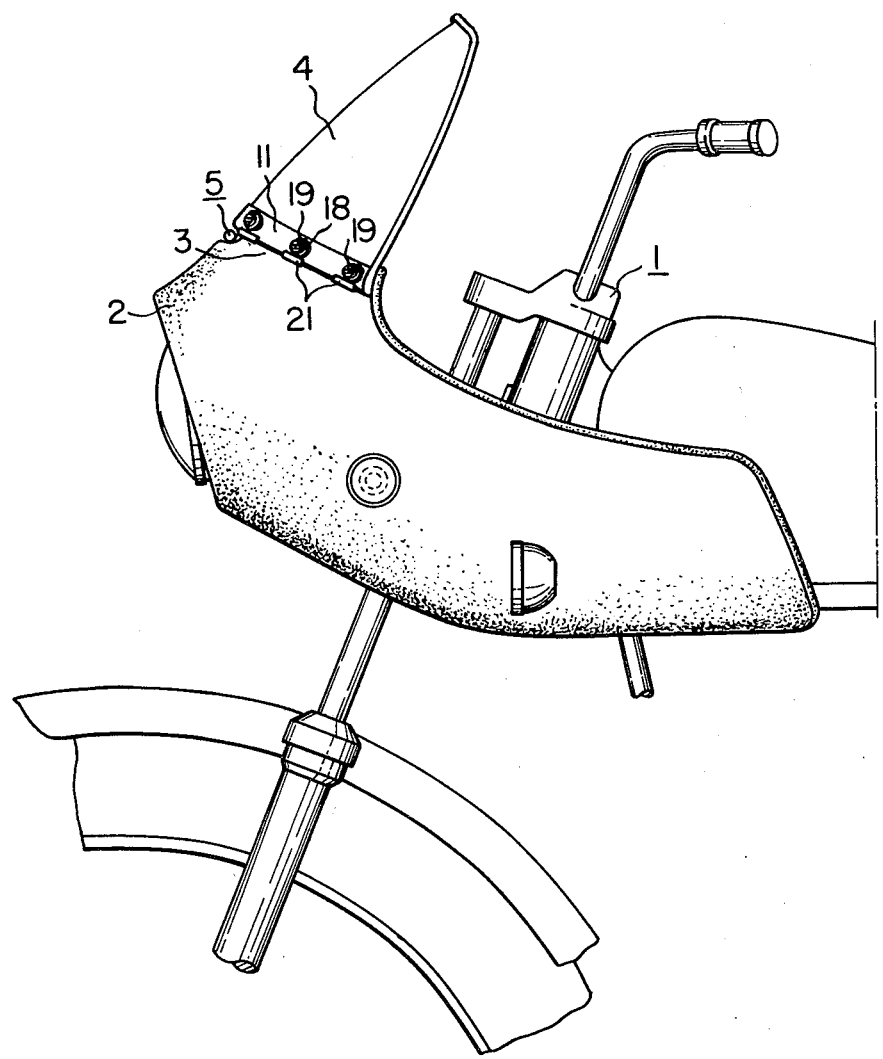
FIG. 1 is a side elevational view of the front part of a motor-cycle provided with the fitting device for the wind shield plate according to the present invention.

Referring now to the accompanying drawing, a fairing 2 is fitted to a front part of the main body 1 of a motor-cycle. On the front upper brim 3 of the fairing 2, there is fitted a transparent wind shield 4. The construction of the fitting part therefor will be described in the following.

In the middle part of the front upper brim 3 of the fairing 2, there is provided a hinge 5 in such a manner that one of the flaps, i.e., a flat flap 6, thereof may swing toward the front side of the motor-cycle body, while an L-shaped flap 7 is fixed to the top portion of the fairing 2 by means of bolts 8 and nuts 9. The center bottom brim portion of the wind shield plate 4 is secured to the flat flap 6 of the hinge 5 by the use of threaded bolts 12 and nuts 13 through a seating plate 10 of plastic material and another lengthy seating plate 11 of any appropriate material.

Figure 2:
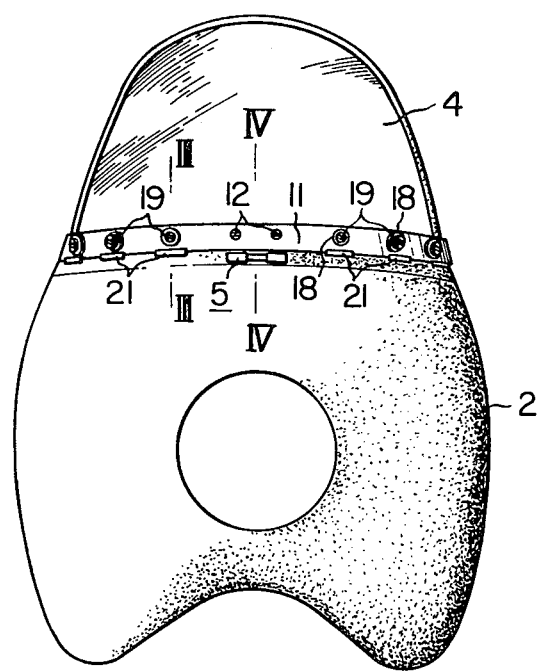
FIG. 2 is a front view showing a fitted state between the wind shield plate and the fairing.
Figure 3:
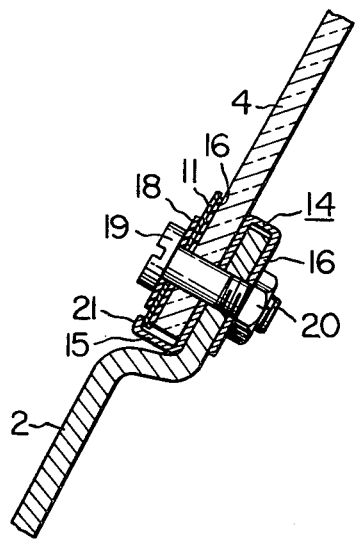
FIG. 3 is a longitudinal cross-section showing the detailed state of fitting taken along the line III-III in FIG 2.
Figure 4:
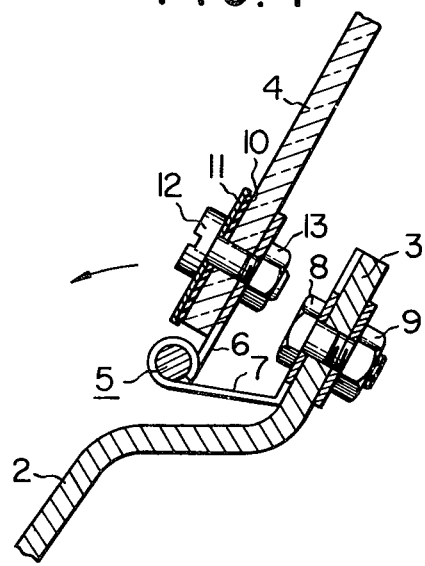
FIG. 4 is also a longitudinal cross-section showing the detailed state of fitting taken along the line IV-IV in FIG. 2.

Off the center part of the fairing 2, i.e., at both sides of the fairing from the center part thereof, there are provided three pieces each of hooking members 14 deeply bent in a U-shape at one part and perpendicularly bent outward in an L-shape at the other part as shown in FIGS. 2 and 3. The U-shaped portion 16 of the hooking member 14 is deeply capped on the upper brim portion of the fairing 2 with the L-shaped portion 15 being positioned in the frontward direction, or in the forwarding direction, of the motor-cycle.

On this L-shaped portion 15 of the hooking member 14, there is placed the bottom brim of the wind shield plate 4 together with a seating plate 16 of plastic material, another lengthy seating plate 11 which extends and spans both ends of the wind shield plate passing through the center part thereof and is fixed by the hinge 5, and a further seating plate 18 of plastic material on the outer surface of the seating plate 11. The combination of these wind shield plate 4, hooking member 14, and seating plates 16, 11, 18 is fastened together by means of threaded bolt 19 and nut 18 made of a material such as plastics, or more specifically nylon, which is subject to breakage or shearing upon exertion thereto of an excessive impact force.

The impact resistance of the hinge 5 per se in its unswingable direction, and the impact resistance at the connection of the hinge 5 and the wind shield plate 4 as well as at the connection of the hinge 5 and the fairing 2 are made greater than that of the threaded bolt 19 and nut 20 made of plastic material.

In the above-described construction of the fitting device for wind shield plate, when the motor-cycle comes into a head-on collision and an excessive impact force acts on the wind shield plate by the cycle rider, the plastic bolts 19 which secure the bottom brim of the wind shield 4 are broken, and, at the same time, the wind shield plate 4 falls frontward with the hinge 5 as the center of its falling frontward to thereby relax the excessive impact force as applied thereto.

Also, when an impact force acts on the wind shield plate 4 from the front during running of the motor-cycle, the energy of the impact force is instantaneously absorbed by the impact resistance of the hinge 5 and by vigorous application of the wind shield plate 4 to a shallow hooking projection 21 protruding from the edge of the outwardly extending L-shaped portion 15 of the hooking member 14. As the result of this, no impact force is directly applied to the bolts 19, hence they can be prevented from becoming broken. Further, when an excessive impact force acts on the wind shield plate 4 from its front, the hinge 5 does not become broken, even if the bolts 19 are cut, but retains the wind shield plate 4 in a connected state with the fairing 2 therethrough, hence the wind shield plate 4 is in no way flown toward the cycle rider. It is also possible that, in place of the hinge 5, the wind shield plate 4 is connected to the fairing 2 by means of a wire rope, chain, and so on so that the distance, in which the wind shield plate 4 flies toward the cycle rider, may be restricted. Moreover, even when the wind shield plate 4 is to be directly fitted to the body of the motor-cycle 1, the above-described construction of the fitting device can be equally applied.

Although the present invention has been described in particular reference to the preferred embodiment, it should be noted that such embodiment is merely illustrative and not so restrictive, and that any change and modification may be made by those skilled in the art without departing from the spirit and scope of the present invention as set forth in the appended claims.

What is claimed is:

1. A fitting device for a wind shield on a motor-cycle, and the like, which comprises in combination: a body of the motor-cycle; a wind shield plate to be fixed to the motor-cycle body; a fairing means fixedly secured at one portion of the motor-cycle body in a surrounding manner with a curvature; means for fixing said wind shield plate to said fairing means, and which is prone to break or deform when an excessive impact force acts thereon; and means for retaining said wind shield plate in a connected state to said fairing means so as to prevent said wind shield plate from flying and hitting a cycle rider, when an excessive impact force acts on said wind shield plate from the forwarding direction of the motor-cycle and said wind shield plate fixing means becomes broken or deformed.

2. The fitting device for wind shield as claimed in claim 1, wherein the impact resistance of said wind shield retaining means is made greater than that of said wind shield plate fixing means.

3. The fitting device for wind shield as claimed in claim 1, wherein said wind shield plate retaining means is disposed at substantially the center part of said curved fairing means.

4. The fixing device for wind shield as claimed in claim 1, wherein said wind shield plate retaining means is a hinge.

5. The fixing device for wind shield as claimed in claim 4, wherein said hinge is made swingable only in the frontward direction of the motor-cycle body.

6. The fixing device for wind shield as claimed in claim 1, wherein said wind shield plate retaining means is a rope or cord.

7. The fixing device for wind shield as claimed in claim 1, wherein said wind shield plate retaining means is a chain.

8. A fixing device for wind shield in motor-cycle, and the like, which comprises in combination: a body of the motor-cycle; a wind shield plate to be fixed to the motor-cycle body; a fairing means fixedly secured at one portion of the motor-cycle body in a surrounding manner with a curvature; a hinge means with one of the flaps being fixedly secured at the center of the upper brim of said fairing means in the front part thereof and with the other flap being made swingable only in the frontward direction of the motor-cycle body; a plurality of hooking members provided at a plurality of positions on the front upper brim of said fairing means at both sides parts off the center thereof, said hooking member having a deeply bent U-shaped portion to be hooked on the upper brim of said fairing means, and an outwardly extending L-shaped portion with a shallow projection at the edge thereof; and threaded bolts and nuts for tightly fitting said wind shield plate to said fairing means, said wind shield plate being fixed at the bottom center part thereof to said frontwardly swingable flap of said hinge by means of said threaded bolts and nuts, and being engaged at both bottom sides portions thereof off the center with said shallow projection provided at the edge of the L-shaped portion of said hooking means, and being tightened by said threaded bolts and nuts integrally to the front upper brim of said fairing means through a thin strip of seating plate covering the entire length of said wind shield plate, the impact strength of said hinge and said threaded bolts and nuts for fixing said wind shield plate to said hinge being made greater than that of said threaded bolts and nuts for fixing said wind shield plate to said fairing means.

* * * * *